UNITED STATES PATENT OFFICE 2,672,468

6-HYDROXY-11-KETO-PROGESTERONE AND ESTERS THEREOF

Robert Bruce Ogilvie and Arthur R. Hanze, Kalamazoo, Mich., assignors to The Upjohn Company, Kalamazoo, Mich., a corporation of Michigan No Drawing. Application April 1, 1952, Serial No. 279,932

7 Claims. (Cl. 260—397.45)

This invention relates to 6-hydroxy-11-keto-progesterone and carboxylic acid esters thereof and more particularly to one to eight carbon atom carboxylic acid esters of 6-hydroxy-11-keto-progesterone.

An object of this invention is to obtain 6-hydroxy-11-keto-progesterone and esters thereof. These compounds have pharmacological activity and are useful in the preparation of cortisone and other 11-hydroxylated steroids.

The compounds of the present invention may be represented by the structural formula:

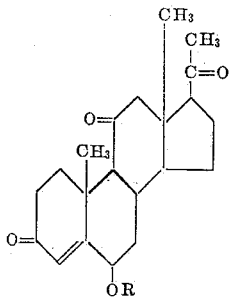

wherein R is hydrogen or acyl.

The following preparations and examples are illustrative of the processes and products of the present invention and are not to be construed as limiting.

PREPARATION 1.—6,11α-DIHYDROXYPROGESTERONE

A medium was prepared from five milliliters of corn steep liquor, twenty grams of Edamine commercial lactalbumin digest and fifty milligrams of Cerelose commercial dextrose per liter of tap water and adjusted to a pH of between about 5.5 and 5.9. To four liters of this medium containing a 32 to 48 hour growth of *Rhizopus arrhizus*, ATCC 11145, at room temperature with aeration was added one gram of progesterone in fifty milliliters of acetone. The culture was then incubated at room temperature for 48 hours. At the end of this time, the pH of the medium was 3.5 and the fermentation liquor and mycelia were extracted successively with three one-liter portions, one two-liter portion, and one one-liter portion of methylene chloride. The methylene chloride extracts were combined and washed with two 400-milliliter portions of a two percent aqueous sodium bicarbonate solution and three 500-milliliter portions of distilled water. The methylene chloride extract was evaporated to dryness in vacuum and the solid residue taken up in fifty milliliters of methylene chloride. The solution was transferred to a 100-milliliter beaker and evaporated by a stream of air. The solids, weighing 1.585 grams, were dissolved in five milliliters of hot methanol and allowed to cool slowly to room temperature. Seventy-five milligrams of crystals, melting at 246 to 249 degrees centigrade, separated from the mother liquor.

PREPARATION 2.—6-HYDROXY-11-KETO-PROGESTERONE

To 500 milligrams (1.44 millimoles) of the above produced 6,11-dihydroxyprogesterone was add 22 milliliters (1.03 millimoles) of chromic acid-acetic acid solution containing 0.0467 millimoles of $CrO_3$ per milliliter. The solution was diluted to 100 milliliters with acetic acid. After remaining at room temperature for about one hour, the reaction mixture was diluted with a few milliliters of methanol and 100 milliliters of water and extracted with methylene chloride. The extract was washed with sodium bicarbonate solution followed by a water wash. The water washed extract was dried over anhydrous sodium sulfate, filtered, and evaporated in vacuum to dryness. The residue was recrystallized from benzene. The crude crystals weighed 240 milligrams, melting point 190 to 196 degrees centigrade. The mother liquor gave thirty milligrams of material melting at 184 to 193 degrees centigrade. Recrystallization of the first crop of crystals gave pure 6-hydroxy-11-keto-progesterone, melting point 204 to 208 degrees centigrade. Infrared spectroscopy confirmed this structure.

*Analysis.*—Calculated for $C_{21}H_{28}O_4$: C, 73.0; H, 7.9. Found: C, 73.01; H, 8.12.

*Example 1.—6-acetoxy-11-keto-progesterone*

A mixture of 100 milligrams of 6-hydroxy-11-keto-progesterone, four milliliters of pyridine and four milliliters of acetic anhydride was maintained at room temperature for 48 hours. This reaction mixture was then diluted with 25 milliliters of water and the mixture was refrigerated to facilitate crystallization. The formed needles of 6-acetoxy-11-keto-progesterone, recovered by filtration, had a melting point of 127 to 128 degrees centigrade, $[\alpha]_D^{25}$ of plus 131 degrees (0.49 in ethanol). Structure was confirmed by infrared spectroscopy.

*Example 2.—6-formyloxy-11-keto-progesterone*

A mixture of 0.5 gram of 6-hydroxy-11-keto-progesterone in twenty milliliters of 87 percent formic acid was heated for two hours at 75 degrees centigrade. Upon adding water to cause precipitation, there resulted crystals of 6-formyloxy-11-keto-progesterone which were separated by filtration.

*Example 3.* — *6-propionyloxy-11-keto-progesterone*

Following the procedure of Example 1, using the equivalent proportion of propionic anhydride in place of acetic anhydride, produced 6-propionyloxy-11-keto-progesterone.

*Example 4.—6-benzoxy-11-keto-progesterone*

Six milliliters of hot benzene was used to dissolve 0.2 gram of 6-hydroxy-11-keto-progesterone. The solution was cooled to room temperature. Then 0.4 milliliter of freshly dried and redistilled pyridine and 0.4 milliliter of freshly-distilled benzoyl chloride were added and maintained at room temperature for twenty hours. The reaction mixture was diluted with fifty milliliters of ether, washed successively with water, ten percent sodium hydroxide solution, and water, dried over anhydrous sodium sulfate, filtered and evaporated free of solvent. The residue was mixed with 25 milliliters of water and maintained under reflux for fifteen minutes, cooled, extracted with ether, washed with water, ten percent sodium hydroxide solution, and again with water, dried over anhydrous sodium sulfate, filtered and evaporated to a volume of ten milliliters. After cooling, the resulting crystals were removed by filtration and washed with benzene to yield crystalline 6-benzoxy-11-keto-progesterone.

*Example 5.—6-(β-carboxypropionyloxy)-11-keto-progesterone*

Following the procedure of Example 1, using succinic anhydride in place of acetic anhydride, produced 6 - (β - carboxypropionyloxy)-11-keto-progesterone.

The corresponding 6-acyloxy-11-keto-progesterones can be made from 6-hydroxy-11-keto-progesterone according to acylation procedures, specifically as illustrated by each of the examples above, or by reaction with ketene, ketenes or an appropriate acid, acid anhydride or acyl halide in an organic solvent such as pyridine or the like. Representative esters of 6-hydroxy-11-keto-progesterone thus-prepared include one to eight carbon atom carboxylic acid acyloxy esters of saturated or unsaturated, aliphatic or carbocyclic, cycloaliphatic, aryl, alkaryl, aralkyl, mono, di or polycarboxylic acids, formyloxy, acetoxy, propionyloxy, butyryloxy, valeryloxy, hexanoyloxy, heptanoyloxy, octanoyloxy, benzoxy, phenylacetoxy, toluoyloxy, cyclopentylformyloxy, β-cyclopentylpropionyloxy, acrylyloxy, cyclohexanoyloxy, and the half and di esters of 6-hydroxy-11-keto-progesterone with malonic, maleic, succinic, glutaric, adipic acids, and the like. The acids may also contain non-interfering substituents, such as mono or poly, halo, chloro, bromo, hydroxy, methoxy or the like.

The compounds of this invention demonstrate pronounced inhibitory properties in esterogenic, glucocorticoid, folliculoid, luteoid, testoid, hypertensive, salt retention as exhibited by desoxycorticosterone, spermatogenic and progesterone activities. 6-hydroxy-11-keto-progesterone may be dehydrated and reduced to pregnane-3,11,20-trione as shown in application Serial Number 278,486, filed March 25, 1952, of which this is a continuation-in-part.

It is to be understood that the invention is not to be limited to the exact details of operation or exact compounds shown and described as obvious modifications and equivalents will be apparent to one skilled in the art and the invention is therefore to be limited only by the scope of the appended claims.

We claim:

1. A compound selected from the group consisting of 6-hydroxy-11-keto-progesterone and 6-acyloxy-11-ketoprogesterone wherein acyloxy is a hydrocarbon-carbonyloxy radical containing from one to eight carbon atoms inclusively.
2. 6-hydroxy-11-keto-progesterone.
3. 6-acyloxy - 11 - keto - progesterone wherein acyloxy is a hydrocarbon-carbonyloxy radical containing from one to eight carbon atoms inclusively.
4. 6-acetoxy-11-keto-progesterone.
5. 6-propionyloxy-11-keto-progesterone.
6. 6-benzoxy-11-keto-progesterone.
7. 6-(β-carboxypropionyloxy) - 11 - keto-progesterone.

ROBERT BRUCE OGILVIE.
ARTHUR R. HANZE.

References Cited in the file of this patent

UNITED STATES PATENTS

| Number | Name | Date |
|---|---|---|
| 2,403,683 | Reichstein | July 9, 1946 |